Jan. 1, 1946.  T. E. ROBBINS, JR  2,392,191
PRODUCTION OF LEAD THIOCYANATE
Filed May 12, 1944
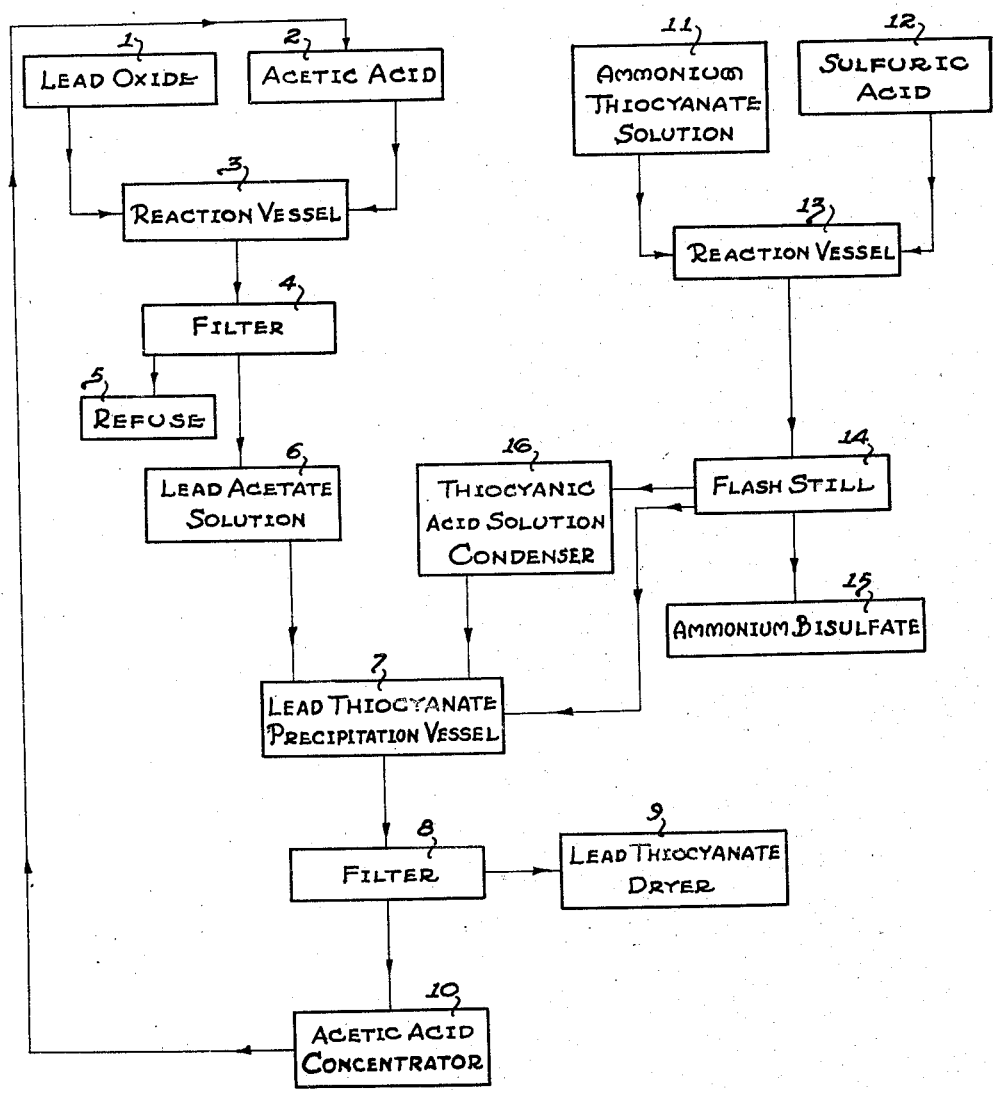
INVENTOR.
THOMAS E. ROBBINS.
BY Edmund G. Borley
his ATTORNEY.

Patented Jan. 1, 1946

2,392,191

UNITED STATES PATENT OFFICE 2,392,191

PRODUCTION OF LEAD THIOCYANATE

Thomas E. Robbins, Jr., Pittsburgh, Pa., assignor, by mesne assignments, to Koppers Company, Incorporated, Pittsburgh, Pa., a corporation of Delaware Application May 12, 1944, Serial No. 535,217

14 Claims. (Cl. 23—75)

The present invention relates to improvements in a process for producing lead thiocyanate.

In the past, lead thiocyanate has been produced by the reaction of lead compounds and alkali thiocyanates, and where a very pure product was desired lead compounds were usually water soluble lead salts, the most available thereof being lead acetate and lead nitrate. Thus, with lead acetate and sodium thiocyanate, the reaction can be written

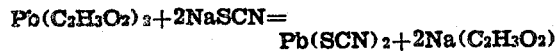

Although using water-soluble reactants, one of the drawbacks to this manner of operation has been the occlusion in the dense lead thiocyanate precipitate of the other non-volatile salts present in the reaction mixture, a condition that has tended to increase the purification costs when producing very pure lead thiocyanate. It was necessary to use the more expensive alkali thiocyanates rather than the cheapest thiocyanate, namely, ammonium thiocyanate, since lead thiocyanate is appreciably soluble in solutions of ammonium salts.

It has now been found that thiocyanic acid made from this inexpensive ammonium thiocyanate can be employed in a process giving high yields of a very pure lead thiocyanate. The above equation would now be written

By this process the occlusion in lead thiocyanate of non-volatile salts is greatly reduced. Further the so-produced acetic acid, or the like can be reused, thus making possible an inexpensive, continuous and partially cyclic process.

The primary object of the present invention is to provide a novel process for the production of highly purified lead thiocyanate by the use of thiocyanic acid as a reactant.

Another object of the invention is a continuous and partially cyclic process for the production of lead thiocyanate.

A further object of the invention is to provide a process for producing highly purified lead thiocyanate from technically pure raw materials.

Yet another object of the invention is to provide an improved process for lead thiocyanate production that utilizes a liquid reaction medium or media.

The invention has for further objects such other improvements and such other operative advantages or results as may be found to obtain in the processes hereinafter described or claimed.

According to the present invention, a lead compound, preferably a water-soluble lead salt, and thiocyanic acid are reacted in a liquid medium to insure rapid reaction. After reaction, the lead thiocyanate is separated from the reaction mixture and is washed to remove the impurities therein that comprise usually only one non-volatile salt. Thereafter, the washed lead thiocyanate is dried at relatively low temperatures and in an atmosphere free of sulfides. When a lead salt is reacted with thiocyanic acid, the acid corresponding to said salt is produced and can be used to produce further quantities of said salt.

In the accompanying drawing forming part of this specification, there is shown a flow diagram illustrating a preferred method for preparing lead thiocyanate from technically pure materials. From separate storage containers a lead oxide 1 and acetic acid solution 2 are flowed to a reaction vessel 3 for conversion of lead oxide to lead acetate. With highly concentrated acetic acid the conversion can be effected in known manner. However, a dilute acetic acid solution can be employed, usually some excess thereof over stoichiometric requirements being employed to effect substantially complete reaction of the available lead oxide. For example, with a 5% aqueous acetic acid solution an excess of about 30% acetic acid over stoichiometric requirements has been found to give satisfactory results. Thus, an acid concentration intermediate a dilute and concentrated form can be employed. Furthermore, the reaction can be effected not only with a lead oxide, but with a lead hydroxide or lead carbonate, or with any known mixtures of these lead compounds. The reaction mixture from reaction vessel 3 is flowed to filter 4, the refuse portion 5 of the lead oxide being discarded, whereas the filtrate comprises a lead acetate solution 6.

The thiocyanic acid required for reaction with so-produced lead acetate solution can be obtained by known methods. However, thiocyanic acid is an unstable product that disintegrates to form perthiocyanic acid, a water-insoluble polymer that would reduce the purity of lead thiocyanate. In the past, when ammonium thiocyanate and sulfuric acid were reacted to form thiocyanic acid, the reaction to form thiocyanic acid and distillation to separate thiocyanic acid from the reaction mixture were effected in the same reaction vessel, the conditions present therein being favorable to thiocyanic acid disintegration. It has now been found, that high yields of pure thiocyanic acid can be obtained by separating the reaction and distillation steps as follows. Heated ammonium thiocyanate solution 11 and heated sulfuric acid 12 are flowed to reaction vessel 13 where thiocyanic acid and ammonium bisulfate are formed, the reactants being controlled so as to produce substantially only said reaction products. Thereafter, the said products are flowed to flash still 14 for rapid separation of thiocyanic acid and water vapor from ammonium bisulfate by a flash distillation, for example, under reduced pressure, the separated thiocyanic acid and water vapor being quickly drawn into and condensed in thiocyanic acid solution condenser 16, whereas the ammonium bisulfate goes to storage 15. Where operating conditions require any appreciable storage period, the thiocyanic acid solution should be stored at temperatures below about 10° C. and the concentration thereof should be maintained at below about 20% thiocyanic acid concentration to minimize polymerization. In addition to sulfuric acid, other strong non-oxidizing mineral acids such as phosphoric acid are valuable for reacting with ammonium thiocyanate to produce thiocyanic acid.

Thiocyanic acid solution 16 and lead acetate solution 6 are flowed to lead thiocyanate precipitation vessel 7, the reaction to produce lead thiocyanate being effected preferably with thorough mixing. The reaction temperature will depend on operating conditions. Where a continuous flow of thiocyanic acid solution can be immediately utilized, the reaction can take place at about the temperature at which the thiocyanic acid solution is condensed. Alternatively, it is also possible to by-pass condenser 16, the thiocyanic acid and water vapor from flash still 14 being flowed, as shown, directly to precipitation vessel 7, wherein both condensation and reaction are then effected. Vessel 7 can be equipped with cooling means where required. Anhydrous thiocyanic acid, where available, can be employed in like manner. It has been found also that reaction can be effected at temperatures below about 10° C., the preferred storage temperature for thiocyanic acid solution. Rather wide variations in the concentration of the thiocyanic acid solution and the lead acetate solution are also possible. After reaction, the reaction mixture is flowed to filter 8, the lead thiocyanate after being washed free of water-soluble impurities is transferred to lead thiocyanate drier 9, whereas the separated acetic acid solution is flowed to acetic acid concentrator 10, wherein the water carried into the system by the thiocyanic acid solution is removed. From concentrator 10 the aqueous acetic acid solution is then recycled to storage 2, and reused for the formation of further quantities of lead acetate solution.

The novel process hereinabove described permits production of highly purified lead thiocyanate from technically pure materials. High yields of said pure product are made possible without the production of secondary reaction products by the production and immediate utilization of so-called nascent reactants. The advantages directly attributable to the thiocyanic acid have been hereinabove set forth. Preparation and utilization of lead acetate in water solution obviates an expensive crystallization step and possible contamination by sulfides in the atmosphere.

Not only can water-insoluble lead compounds such as the lead oxides, lead hydroxides and lead carbonates be employed interchangeably to produce lead acetate, or the like, but said compounds can be reacted directly with thiocyanic acid solution, where a highly purified lead thiocyanate is not required. In addition to lead acetate other water-soluble lead salts can be used, the cheapest and easiest available of the said salts being lead nitrate.

Lead thiocyanate can be formed by reaction of a lead compound with thiocyanic acid, the latter being in the vapor phase. However the yields are not as good as those produced by reaction in a liquid medium, preferably an aqueous medium. Under some circumstances an organic medium may be of utility since thiocyanic acid is soluble in organic solvents such as ether and amyl alcohol and it is known that organic solvent solutions of thiocyanic acid are more stable than the aqueous solutions. The above-mentioned lead compounds can be reacted directly with such an organic solvent solution of thiocyanic acid, and good yields of lead thiocyanate are obtainable, for example, by reacting said solution with an aqueous lead acetate solution. Changes in the hereinabove given flow diagram to operate said latter process would include an organic solvent extractor for thiocyanic acid to replace flash still 14, and some means for separating aqueous acetic acid from organic solvent would be required in addition to concentrator 10.

The hereinabove described continuous, cyclic process can, of course, be operated as a batch process, or the lead thiocyanate can be prepared by reacting thiocyanic acid solution with a lead compound as hereinabove described, no other products being recovered. In the latter said operation it is preferred to employ an aqueous thiocyanic acid solution of less than about 20% concentration that has been stored at temperatures of less than 10° C. to prevent polymerization. Excellent yields of highly purified lead thiocyanate have been obtained by reacting said thiocyanic acid solution at temperatures below about 10° C. with a lead salt solution of less than about 40% concentration. An excess of thiocyanic acid solution over stoichiometric requirements for example, a 10% excess thereof, will be found of advantage to react with all of the lead salt, thereby assuring substantially a theoretical yield based on lead salt employed. In a cyclic process an excess of thiocyanic acid over stoichiometric requirements would ordinarily not be employed and where present inadvertently would and should be vented on concentrating the recycled acid. Any conversion product of thiocyanic acid should be removed before acetic acid, or the like, is recycled.

The following specific examples illustrate the results obtainable by practice of the present invention.

*Example 1*

Aqueous thiocyanic acid solutions of various concentrations were reacted at different temperatures with a number of lead compounds and aqueous lead salt solutions to produce lead thiocyanate. In the following table are summarized the results of these tests, the yields shown representing the percent of theoretical yield based on the lead compound employed. The percent excess of thiocyanic acid where employed was that quantity in excess of stoichiometric requirements. The purity of the product in each instance is represented by the percent lead thiocyanate therein.

| No. | Aqueous HSCN percent concentration | Lead compound aq. solution percent concentration | Temp. of reaction, °C. | Yield, percent | Percent Pb(SCN)$_2$ in product | Other conditions |
|---|---|---|---|---|---|---|
| 1 | 9% HSCN | Lead monoxide | 0 | 84 | 53 | Oxide added to HSCN with stirring. |
| 2 | 15% HSCN | Lead white | 0 | 95 | 86.4 | 10% excess HSCN stirred into mush of lead white. |
| 3 | 13% HSCN | 30% lead nitrate | 5 | 98.5 | 99.0 | 10% excess HSCN to lead nitrate. |
| 4 | 9% HSCN | 17% lead acetate | 5 | 94.0 | 98.6 | Lead acetate added to HSCN (no excess). |
| 5 | 7% HSCN | 21% lead acetate | 25 | 97.8 | 98.6 | Do. |
| 6 | 17% HSCN | 25% lead acetate | 5 | 100.0 | 99.1 | 10% excess HSCN to lead acetate. |
| 7 | 13% HSCN | 20% lead acetate | 5 | 100.0 | 99.5 | Do. |

*Example 2*

An ether solution containing about 0.4 mol of thiocyanic acid was prepared by ether extraction of a mixture of ammonium thiocyanate solution and sulfuric acid. The ether extract was reacted with an excess of 20% aqueous lead nitrate solution. There was separated from said reaction mixture 60 grams of lead thiocyanate, a yield that was 93% of theory.

The invention as hereinabove set forth is embodied in particular form and manner but may be variously embodied within the scope of the claims hereinafter made.

I claim:

1. A process for producing lead thiocyanate, comprising: reacting a thiocyanic acid solution with a lead compound chosen from the group consisting of lead oxide, lead hydroxide, lead carbonate and water-soluble lead salts to form lead thiocyanate; and thereafter separating so-produced lead thiocyanate from the reaction mixture.

2. A process for producing lead thiocyanate, comprising: reacting a lead compound chosen from the group consisting of lead oxide, lead hydroxide, lead carbonate and water-soluble lead salts with aqueous thiocyanic acid solution to form lead thiocyanate; and thereafter separating so-produced lead thiocyanate from the reaction mixture.

3. A process for producing lead thiocyanate, comprising: reacting a lead compound chosen from the group consisting of lead oxide, lead hydroxide, lead carbonate and water-soluble lead salts with an organic solvent solution of thiocyanic acid to form lead thiocyanate; and thereafter separating so-produced lead thiocyanate from the reaction mixture.

4. A process for producing lead thiocyanate, comprising: reacting an aqueous solution of a lead salt with thiocyanic acid to form lead thiocyanate; and thereafter separating lead thiocyanate.

5. A process for producing lead thiocyanate, comprising: reacting in aqueous solution a lead salt and thiocyanic acid and thereby precipitating lead thiocyanate; and thereafter separating said precipitated lead thiocyanate.

6. A process for producing lead thiocyanate, comprising: reacting water solutions of lead acetate and thiocyanic acid to form lead thiocyanate; and thereafter separating said precipitated lead thiocyanate.

7. A process for producing lead thiocyanate, comprising: reacting water solutions of lead nitrate and thiocyanic acid to form lead thiocyanate; and thereafter separating said precipitated lead thiocyanate.

8. A process for producing lead thiocyanate in high yields, comprising: admixing in aqueous solution a lead salt with an excess over stoichiometric proportions of thiocyanic acid to form lead thiocyanate, and separating said lead thiocyanate from the reaction mixture.

9. A process for producing lead thiocyanate, comprising: reacting a water-soluble lead salt with an aqueous thiocyanic acid solution at a temperature below about 10° C. to form lead thiocyanate, the said thiocyanic acid solution being substantially free of its polymer, perthiocyanic acid; and thereafter separating lead thiocyanate from other reactants.

10. A process for producing lead thiocyanate, comprising: reacting at a temperature of less than 10° C. an aqueous solution of lead nitrate with an aqueous thiocyanic acid solution of less than 20% concentration and thereby precipitating lead thiocyanate; and thereafter separating so-precipitated lead thiocyanate.

11. A process for producing highly purified lead thiocyanate, comprising: admixing a 20% aqueous solution of lead acetate with a 10% excess over stoichiometric requirements of a 13% aqueous thiocyanic acid solution and reacting the mixture at a temperature in a range of about 0° C. to 5° C. to precipitate lead thiocyanate; separating lead thiocyanate from aqueous solution; washing precipitated lead thiocyanate to remove impurities therefrom; and thereafter drying said lead thiocyanate.

12. A process for producing lead thiocyanate, comprising: reacting a lead salt and thiocyanic acid in aqueous medium to form lead thiocyanate and an acid having the anion of said lead salt; separating lead thiocyanate from the aqueous acid solution; reacting said acid solution with a lead compound chosen from the group consisting of lead oxide, lead hydroxide and lead carbonate and thereby forming said lead salt in solution; separating the lead salt solution and reacting it with further quantities of thiocyanic acid.

13. A process for producing lead thiocyanate, comprising: reacting an aqueous ammonium thiocyanate solution with sulfuric acid to form thiocyanic acid and ammonium bisulfate; flash distilling the reaction mixture to separate thiocyanic acid and water vapor from ammonium salt; reacting lead oxide with aqueous acetic acid to form lead acetate solution; separating lead acetate solution from the said reaction mixture; reacting so-produced lead acetate solution, thiocyanic acid and water vapor to form lead thiocyanate and acetic acid solution; separating lead thiocyanate and acetic acid solution; concentrating said acetic acid solution by removal of water therefrom; recycling so-concentrated aqueous acetic acid into reaction with further quantities of lead oxide; and thereafter repeating the hereinabove described process for lead thiocyanate production.

14. A process for producing lead thiocyanate, comprising: reacting an aqueous ammonium thiocyanate solution with sulfuric acid to form thiocyanic acid; flash distilling the reaction mixture to separate an aqueous thiocyanic acid of less than 20% concentration; reacting a lead oxide with aqueous acetic acid; separating aqueous lead acetate from the said reaction mixture; reacting the aqueous solutions of lead acetate and thiocyanic acid at a temperature below 10° C.; separating lead thiocyanate from acetic acid solution; washing lead thiocyanate to remove impurities therefrom; drying so-washed lead thiocyanate; concentrating said acetic acid solution; recycling so-concentrated aqueous acetic acid into reaction with further quantities of a lead oxide.

THOMAS E. ROBBINS, Jr.